(12) United States Patent
Mehta et al.

(10) Patent No.: US 8,948,999 B2
(45) Date of Patent: Feb. 3, 2015

(54) FUEL INJECTION DURING NEGATIVE VALVE OVERLAP FOR STOICHIOMETRIC DIESEL OPERATIONS

(75) Inventors: Darius Mehta, San Antonio, TX (US); Chad P. Koci, San Antonio, TX (US); Charles E. Roberts, Jr., Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 868 days.

(21) Appl. No.: 13/175,872

(22) Filed: Jul. 3, 2011

(65) Prior Publication Data

US 2013/0006498 A1    Jan. 3, 2013

(51) Int. Cl.
| | | |
|---|---|---|
| *B60T 7/12* | (2006.01) | |
| *G05D 1/00* | (2006.01) | |
| *G06F 7/00* | (2006.01) | |
| *G06F 17/00* | (2006.01) | |
| *F02B 3/00* | (2006.01) | |
| *F02D 41/40* | (2006.01) | |
| *F02D 35/02* | (2006.01) | |
| *F02D 13/02* | (2006.01) | |

(52) U.S. Cl.
CPC ............ *F02D 41/402* (2013.01); *F02D 35/028* (2013.01); *Y02T 10/44* (2013.01); *F02D 13/0265* (2013.01)
USPC .......................................... 701/104; 123/299

(58) Field of Classification Search
CPC .............. F02D 13/0265; F02D 41/402; F02D 2041/001; F02D 41/0002; F02D 13/0207; F02D 41/3064; F02D 41/3035; Y02T 10/18; F02B 1/12
USPC ............. 123/90.15, 90.16, 90.17, 90.18, 299, 123/305; 701/103, 104, 105
See application file for complete search history.

(56) References Cited

U.S. PATENT DOCUMENTS

| | | | |
|---|---|---|---|
| 2006/0005804 A1* | 1/2006 | Kuo et al. ...................... | 123/295 |
| 2006/0174853 A1* | 8/2006 | Koopmans ..................... | 123/295 |
| 2006/0196467 A1* | 9/2006 | Kang et al. .................... | 123/305 |
| 2006/0196469 A1* | 9/2006 | Kuo et al. ...................... | 123/305 |
| 2008/0000446 A1* | 1/2008 | Strom et al. ................... | 123/295 |
| 2008/0275622 A1* | 11/2008 | Strom et al. ................... | 701/103 |
| 2009/0164104 A1* | 6/2009 | Wermuth et al. .............. | 701/105 |

\* cited by examiner

*Primary Examiner* — Mahmoud Gimie
*Assistant Examiner* — Sizo Vilakazi
(74) *Attorney, Agent, or Firm* — Chowdhury & Georgakis PC; Ann C. Livingston

(57) ABSTRACT

A method of stoichiometrically operating a diesel-fueled internal combustion engine. During a main (conventional) fuel injection event, fuel is injected into the cylinders. The air-fuel ratio during this main fuel injection event is stoichiometric. The cylinders are operated by either advancing the exhaust valve closing or modifying the phasing of the exhaust and intake valve lift events, to achieve a negative valve overlap period between the end of the exhaust phase and the beginning of the intake phase of the engine cycle. Fuel is injected into the cylinders during the negative valve overlap period, which results in highly reactive fuel and reduces ignition delay during the main fuel injection event.

9 Claims, 3 Drawing Sheets

US 8,948,999 B2

FUEL INJECTION DURING NEGATIVE VALVE OVERLAP FOR STOICHIOMETRIC DIESEL OPERATIONS

TECHNICAL FIELD OF THE INVENTION

This invention relates to diesel-fueled internal combustion engines, and more particularly to operating such engines stoichiometrically by providing a secondary fuel injection event during a negative valve overlap condition in the cylinders.

BACKGROUND OF THE INVENTION

As emissions legislation continues to lower the limits for diesel engine pollutants, the use of alternative diesel combustion strategies is increasing. Although these strategies offer lower emissions levels, they also tend to increase the sensitivity of diesel combustion to variants in control parameters, fuel properties, hardware degradation, and ambient conditions.

In a diesel engine, achieving desired combustion with low emissions as opposed to instable combustion is a strong function of thermodynamic conditions upon fuel injection. Unlike a spark-ignition engine, a diesel engine has its onset of combustion decoupled from a direct control parameter. However, in a conventional diesel engine, the ignition delay period after the start of fuel injection until combustion is brief. This minimizes the effect of the decoupling, and brings the injection timing control parameter closer to being an ignition timing control parameter.

With various alternative diesel combustion strategies, the ignition delay period can be long. As a result, the decoupling of ignition timing from injection timing is more pronounced. Under these conditions, the thermodynamic state of the cylinder charge dictates the ignition timing. Control of this thermodynamic state is achievable, but at a much slower timescale than desired for optimal combustion control.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a method for achieving a fast acting ignition control parameter for a diesel-fueled internal combustion engine. These methods enhance control of diesel auto-ignition, and greatly aid in advanced combustion strategies.

More specifically, the methods described herein allow stoichiometric diesel combustion to occur at low engine cylinder pressures and densities, promote auto-ignition of advanced diesel combustion strategies, and enable a more direct ignition control parameter.

The low cylinder pressures and densities of stoichiometric diesel combustion arise from intake manifold throttling to sub-atmospheric conditions for the reduction of engine fresh air flow. As the engine is throttled, the ignition delay corresponding to the main injection event increases.

As explained below, a negative valve overlap (NVO) period may be created with cylinder valve or valve cam modification. A "secondary" fuel injection event before the main (conventional) fuel injection event can be performed during this NVO period. The fuel injected during the NVO period will partially react, or crack, to hydrocarbon species that have a high propensity to auto-ignite.

The quantity and timing of the NVO injection(s) are determined so that the ignition delay of the main fuel injection event is reduced to desirable levels. This reduction in ignition delay is due to the highly reactive NVO hydrocarbon species.

Figure 1:
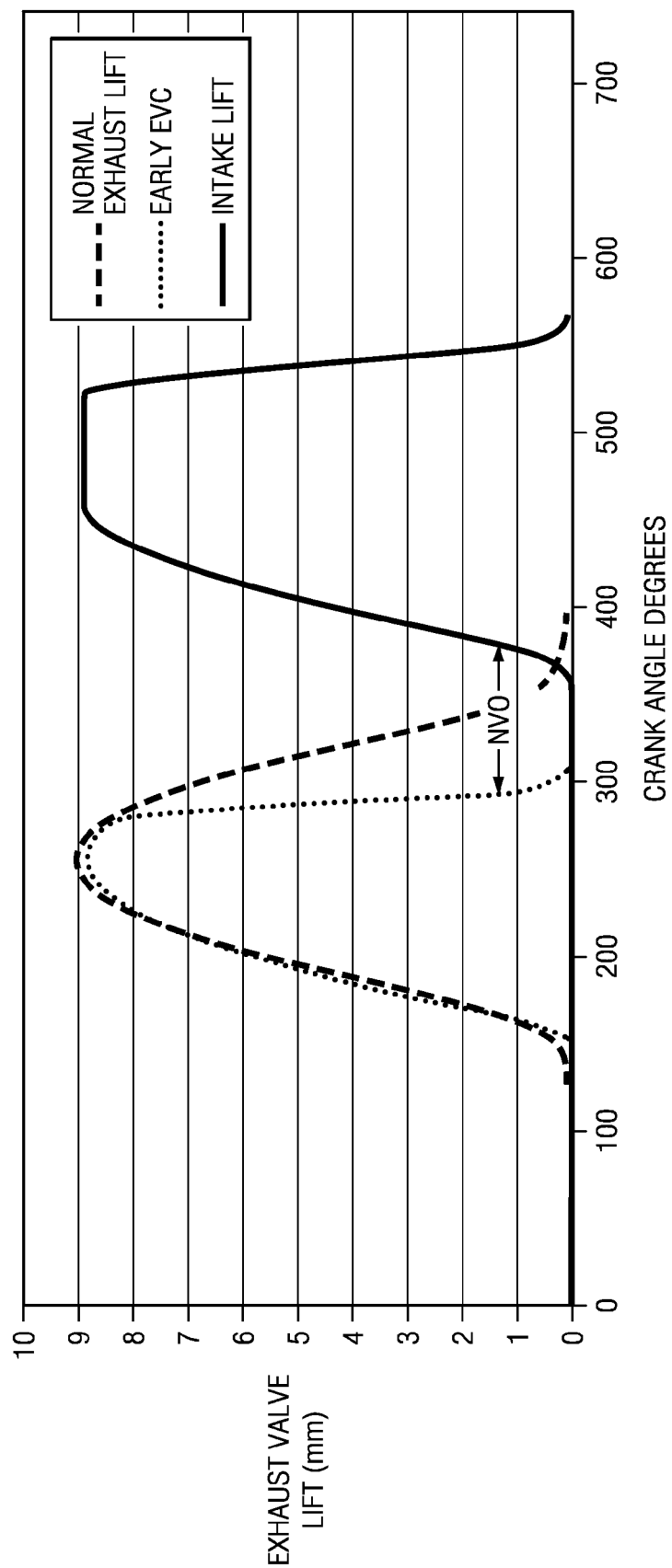
FIG. 1 illustrates an example of how negative valve overlap may be achieved with early exhaust valve closing.

FIG. 1 illustrates an example of NVO achieved with early exhaust valve closing (EVC). Exhaust valve lift is shown as a function of crank angle degrees. The solid line represents normal intake valve lift. The dashed line represents normal exhaust valve lift. The dotted line represents early exhaust valve closing (also referred to herein as "advancing" the exhaust valve closing).

As illustrated, both the intake and exhaust valves are closed during a predetermined crank-angle period. This period is between the end of the exhaust valve lift and the beginning of the intake valve lift, and is referred to herein as a "negative valve-overlap" (NVO) period.

In the example of FIG. 1, the NVO period is between about 300 and 360 crank angle degrees. The timing of the EVC can be adjusted to result in a shorter or longer EVO period.

Figure 2:
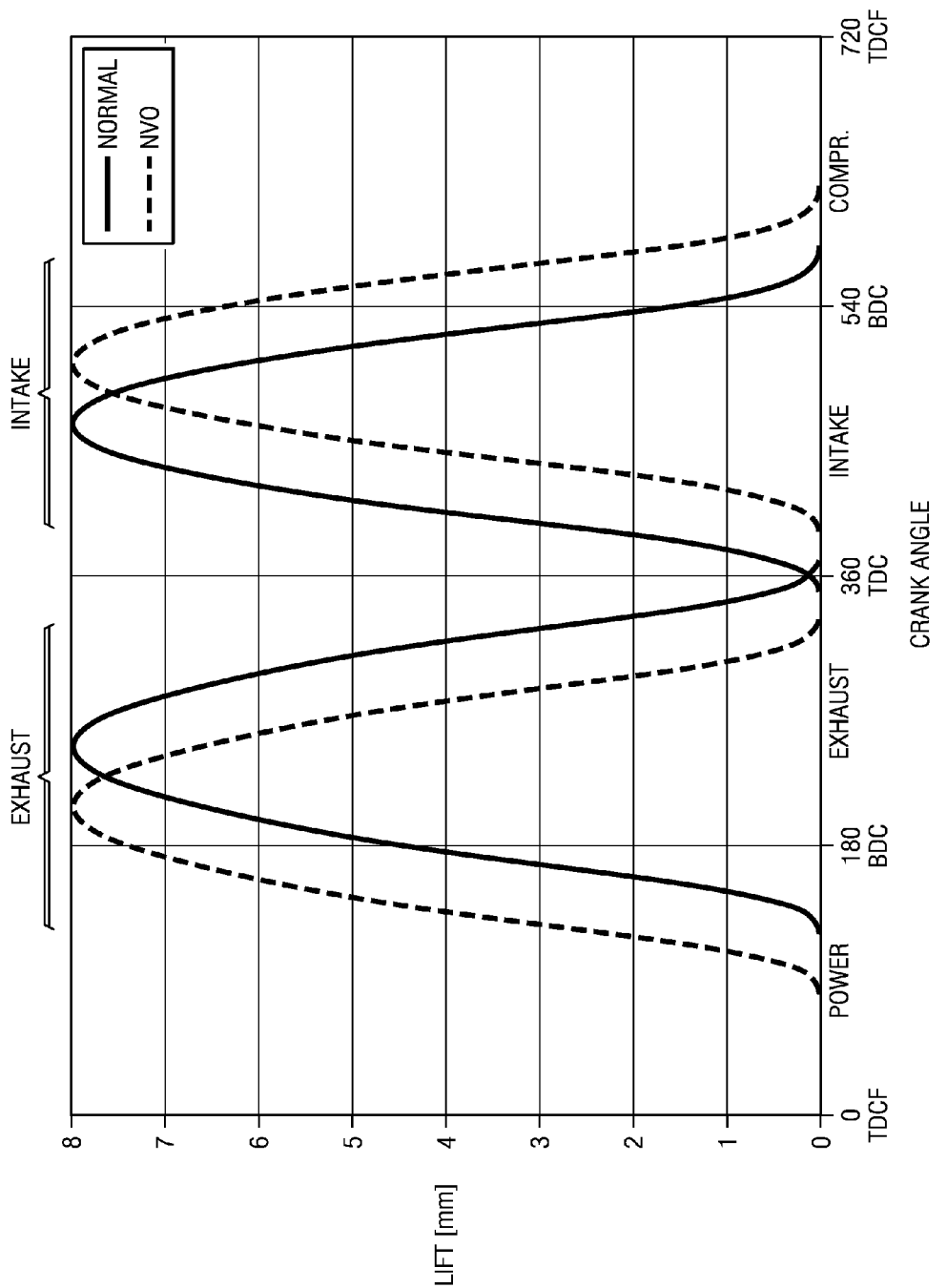
FIG. 2 illustrates an example of how negative valve overlap may be achieved with intake and exhaust cam phasing.

FIG. 2 illustrates an example of NVO achieved with intake and exhaust cam phasing. Both intake and exhaust valve lift are shown as a function of crank angle degrees. The solid lines represent normal exhaust valve and intake valve lift. The dotted lines represent the result of cam phasing to achieve NVO. The exhaust valve lift is advanced and the intake valve lift is delayed (relative to "normal" engine cycle operation), each by a predetermined crank number of angle positions (referred to herein as a "phase modification").

Figure 3:
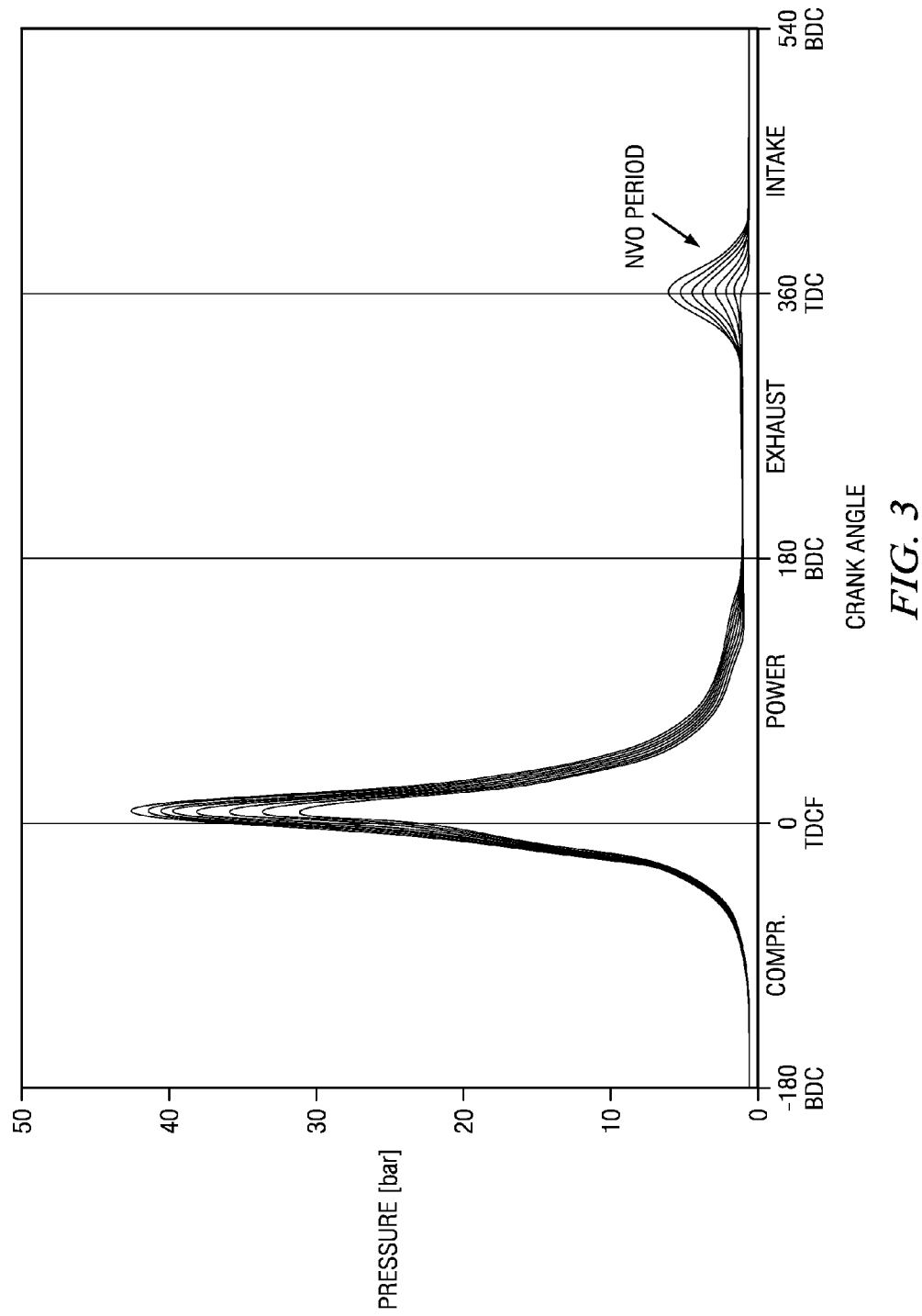
FIG. 3 illustrates cylinder pressure as a function of crank angle, with a negative valve overlap period.

FIG. 3 illustrates engine cylinder pressure as a function of crank angle degree, with NVO implemented using cam phasing (FIG. 2). As is normal, the highest cylinder pressure is at about crank angle 0 degrees (TDCF). The NVO results in a second pressure rise. If NVO were implemented with exhaust valve lift modification, a second pressure rise would similarly occur.

In the example of FIG. 3, the NVO period is centered at about 360 crank angle degrees (near TDC). The various plots represent varying NVO phase modifications. In the example of FIG. 3, the NVO phase modifications range from about 5 crank angle degrees to 40 crank angle degrees. Varying the phase allows the duration of the pressure rise and the peak pressure to be varied. A larger NVO phase results in a longer and greater pressure rise. The timing (both duration and crank angle location) of the NVO period can be optimized for a particular engine and its operating conditions.

For stoichiometric operation of a diesel-fueled internal combustion engine, the intake manifold pressure is throttled to sub-atmospheric levels. A stoichiometric air-fuel ratio is provided for combustion.

During each engine cycle, a negative valve overlap period is created. This may be achieved by either early exhaust valve closing or cam phasing, as described above. During the negative valve overlap period, a fuel injection event, referred to herein as an "NVO fuel injection event" or "secondary fuel injection event", is performed.

Fuel injection during the negative valve overlap (NVO) period will create partially reacted, high auto-ignition propensity hydrocarbon species. These highly reactive species will promote ignition and reduce injection ignition delay at the time of the main fuel injection event. In this manner, otherwise unachievable low load stoichiometric diesel operation will be enabled due to the increase in reactivity from the highly reactive species created from the NVO fuel injection events.

For the NVO fuel injection event, the amount of fuel, the air-fuel ratio, and the injection timing relative to the NVO period, as well as the timing of the NVO period itself, are all parameters that can be adjusted. For example, the NVO fuel injection may be timed to occur at the peak pressure rise during the NVO period, or at some other time during the NVO period. In general, the objective is to obtain the reactive fuel characteristics described herein.

The NVO fuel injection event is followed by the main fuel injection event at a conventional time during the engine cycle. Referring to FIG. 3, typically, the main fuel injection event occurs at about the top of the compression stroke (TDCF), so that fuel is injected into compressed air in the combustion chamber. Optimal timing of both fuel injection events will depend on the engine design as well as its speed and load.

With the use of NVO fuel injection, auto-ignition and ignition timing control can be enhanced in advanced diesel combustion strategies that would otherwise have poor auto-ignition characteristics. This improved auto-ignition and controllability will produce lower engine emissions and better engine efficiency.

What is claimed is:

1. A method of stoichiometrically operating a diesel-fueled internal combustion engine, the engine having one or more combustion cylinders, each cylinder having an associated piston, intake valve and exhaust valve, comprising:
   injecting diesel fuel into the cylinders during a compression stroke of the pistons, thereby providing a main fuel injection event;
   wherein the air-fuel ratio during the main fuel injection event is stoichiometric;
   advancing the exhaust valve closing such that a negative valve overlap period occurs between the end of the exhaust phase and the beginning of the intake phase of the engine cycle;
   determining whether intake manifold throttling has resulted in an undesired ignition delay;
   if the determining step results in an undesired ignition delay, determining a quantity and timing for a secondary fuel injection event, and injecting diesel fuel into the cylinders during the negative valve overlap period, thereby providing the secondary fuel injection event.

2. The method of claim 1, further comprising the step of adjusting at least one of the following parameters during the secondary fuel injection event to result in partially reacted hydrocarbon in the cylinder: amount of fuel, air-fuel ratio, injection timing.

3. The method of claim 1, wherein the negative valve overlap period has a phase ranging from 5 to 40 crank angle degrees.

4. The method of claim 1, wherein the secondary fuel injection event is timed to occur during a peak cylinder pressure rise of the negative valve overlap period.

5. A method of stoichiometrically operating a diesel-fueled internal combustion engine, the engine having one or more combustion cylinders, each cylinder having an associated piston, intake valve and exhaust valve, comprising:
   injecting diesel fuel into the cylinders during a compression stroke of the pistons, thereby providing a main fuel injection event;
   wherein the air-fuel ratio during the main fuel injection event is stoichiometric;
   advancing the exhaust valve lift and delaying the intake valve lift, such that a negative valve overlap period occurs between the end of the exhaust phase and the beginning of the intake phase of the engine cycle;
   determining whether intake manifold throttling has resulted in an undesired ignition delay;
   if the determining step results in an undesired ignition delay, determining a quantity and timing for a secondary fuel injection event, and injecting diesel fuel into the cylinders during the negative valve overlap period, thereby providing the secondary fuel injection event.

6. The method of claim 5, further comprising the step of adjusting at least one of the following parameters during the secondary fuel injection event to result in partially reacted hydrocarbon in the cylinder: amount of fuel, air-fuel ratio, injection timing.

7. The method of claim 5, wherein the negative valve overlap period has a phase ranging from 5 to 40 crank angle degrees.

8. The method of claim 5, wherein the secondary fuel injection event is timed to occur during a peak cylinder pressure rise of the negative valve overlap period.

9. The method of claim 5, wherein the step of advancing the exhaust valve lift and delaying the intake valve lift is performed by adjusting the cam phasing of the exhaust and intake valves.

* * * * *